United States Patent [19]

Godesa

[11] Patent Number: 4,750,375
[45] Date of Patent: Jun. 14, 1988

[54] DRIVE DEVICE FOR A CIRCUIT BREAKER WITH A RATCHET WHEEL

[75] Inventor: Ludvik Godesa, Berlin, Fed. Rep. of Germany

[73] Assignee: Siemens Aktiengesellschaft, Munich, Fed. Rep. of Germany

[21] Appl. No.: 903,397

[22] Filed: Sep. 3, 1986

[30] Foreign Application Priority Data

Sep. 13, 1985 [DE] Fed. Rep. of Germany ....... 3533179

[51] Int. Cl.$^4$ ............................................ G05G 17/00
[52] U.S. Cl. .......................................... 74/2; 74/150;
185/40 R; 188/82.3; 192/104 C; 192/106 R; 200/153 SC
[58] Field of Search ............................ 74/2, 150, 151;
185/40 R, 37, 39; 188/82.3, 82.4; 200/153 SC; 192/104 C, 106 R

[56] References Cited

U.S. PATENT DOCUMENTS

| | | | |
|---|---|---|---|
| 2,417,602 | 3/1947 | Larkin | 188/82.3 |
| 3,689,720 | 9/1972 | Patel | 74/150 X |
| 3,791,231 | 2/1974 | Geary | 192/104 C X |
| 4,095,676 | 6/1978 | Howe et al. | 185/40 R |
| 4,153,828 | 5/1979 | Barkan | 200/153 SC |
| 4,167,988 | 9/1979 | Acampora et al. | 185/40 R |

FOREIGN PATENT DOCUMENTS 1347857 11/1963 France .
799665 8/1958 United Kingdom .

Primary Examiner—Allan D. Herrmann
Attorney, Agent, or Firm—Kenyon & Kenyon

[57] ABSTRACT

A drive device for a low-voltage circuit breaker comprises a ratchet wheel with teeth which are engaged by a transporting ratchet by a periodic back-and-forth motion of a cage having the transporting ratchet disposed thereon. A stepwise rotation of the ratchet wheel for cocking an energy accumulator is brought about by the motion of the cage. Upon the release of the energy accumulator, which may be a tension spring for closing switch contacts, the ratchet wheel rotates at high speed relative to the transporting ratchet. Damage to the cooperating parts of the ratchet wheel and transporting ratchet is prevented by a centrifugal force level which is supported in the ratchet wheel in a radially tiltable manner and which protrudes during the fast rotation of the ratchet wheel with a working surface of circular arc shape beyond the heads of the teeth, so that the transporting ratchet is kept away from the teeth. As soon as the ratchet wheel comes to a standstill, the centrifugal force disappears and the transporting ratchet comes into engagement again with one of the teeth under the influence of a bending spring.

2 Claims, 2 Drawing Sheets

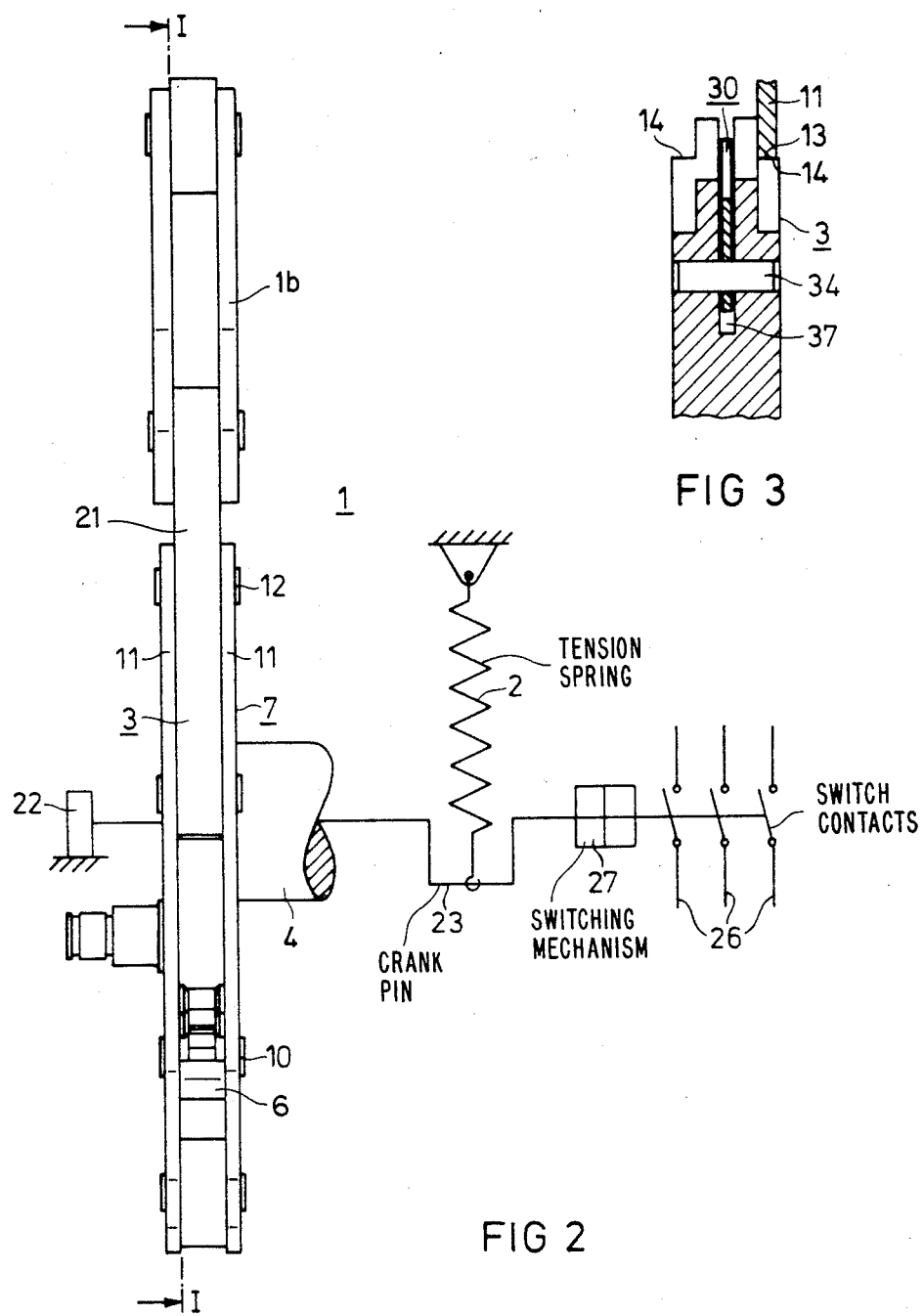

DRIVE DEVICE FOR A CIRCUIT BREAKER WITH A RATCHET WHEEL

BACKGROUND OF THE INVENTION

The present invention relates to a drive device for a circuit breaker with a ratchet wheel for cocking an energy accumulator by stepwise rotation of the ratchet wheel by means of a transporting ratchet, as well as with a device for lifting the transporting ratchet out of the teeth of the ratchet wheel when the latter rotates in the course of releasing the tension of the energy accumulator.

A drive device of this type has become known from U.S. Pat. No. 4,167,988. The device for lifting the transporting ratchet there has the purpose of preventing damage which can occur during the very rapid rotation of the ratchet wheel connected with the tension release of the energy accumulator at its teeth as well as at the transporting ratchet. Damage of this kind limits the useful life of the drive device and must therefore be kept so low that the number of switching cycles provided in practice can be executed.

The use of a separate device for lifting the transporting ratchet is based on the insight that also an intentional overdesign of the interacting parts is not sufficient to prevent the detrimental wear. The reason for this is seen in the extremely high velocity of rotation of the ratchet wheel during the tension release of the energy accumulator and a correspondingly high velocity when the teeth of the ratchet wheel and the transporting ratchet meet. In detail, this operation begins when the transporting ratchet is flung away against its contact pressure. The transporting ratchet then tilts about its pivot and strikes a stop which reflects the transporting ratchet. The latter then hits the ratchet wheel again and is flung off. In the mentioned known device for preventing wear of the drive device, the first flinging-off of the transporting ratchet away from the ratchet wheel is utilized for releasing a latch which is under spring tension and holds the transporting ratchet in the lifted condition. However, it is then necessary to reset the latch before the energy accumulator is cocked again, so that the transporting ratchet can again get into engagement with the teeth of the ratchet wheel.

SUMMARY OF THE INVENTION

Starting from a drive device of the type mentioned above, it is an object of the present invention to make the device for lifting-out the transporting ratchet so simple that an increase in size of the drive device by additional latches and corresponding parts is prevented as far as possible and special means for resetting such latches are not required.

The above and other objects of the present invention are achieved by a device for a circuit breaker with a ratchet wheel for cocking an energy accumulator by stepwise rotation of the ratchet wheel by means of a transporting ratchet, as well as with a device for automatically lifting the transporting ratchet out of the teeth of the ratchet wheel while the latter rotates in the course of the tension release of the energy accumulator, comprising coupling means for acting upon the transporting ratchet by a centrifugal force acting in the sense of lifting the transporting ratchet out of the teeth of the ratchet wheel, and which is dependent on the rotation of the ratchet wheel during the tension release of the energy accumulator.

Thus, the objects of the invention are met by providing coupling means for acting on the transporting ratchet by a centrifugal force which acts in the direction of lifting the transporting ratchet out of the teeth of the ratchet wheel and depends on the rotation of the ratchet wheel when the tension of the energy accumulator is released. Since the centrifugal force depends on the velocity of the ratchet wheel and therefore assumes the value 0 when the ratchet wheel comes to a standstill, the transporting ratchet can automatically come into engagement with the teeth of the ratchet wheel again. Thereby, a separate device for resetting the device is eliminated. Further eliminated is a separate energy accumulator for actuating the device because the centrifugal force is obtained directly from the rotation of the ratchet wheel. Due to these properties, the device according to the invention can be integrated into the drive device so completely that additional space requirement is negligible.

For obtaining the centrifugal force, a member which can pivot radially and is supported asymmetrically as well as with a distance from the axis of rotation of the ratchet wheel can be connected to the ratchet wheel. In consideration of the mentioned high velocity of rotation of the ratchet wheel, this member needs to have only a relatively small mass. Accordingly, the pivoted member is small and can be accommodated in the drive device without difficulty.

A design of the pivoted member as a one-arm lever turns out to be advantageous which has an outer working surface in the shape of a circular arc as coupling means for the transporting ratchet. With this working surface the one-arm lever slides along the transporting ratchet with little wear if the ratchet wheel rotates fast during the tension release of the energy accumulator. During the stepwise rotation of the ratchet wheel for tensioning the energy accumulator, the one-arm lever is pushed by the customary contact pressure spring of the transporting ratchet into its inoperative rest position, where, depending on the position of the parts, at most the force of the weight of the one-arm lever must be overcome. A separate resetting spring for the one-arm lever can therefore be dispensed with.

It is advisable to arrange the one-arm lever in a radial recess of the ratchet wheel. This leads to a particularly advantageous design of the device since the ratchet wheel itself can be used here for the support of the one-arm lever; lateral guidance of the one-arm lever is provided and reliable cooperation of the transporting ratchet is assured.

The one-arm lever can advantageously be designed in the form of a circular arc and can cooperate with a stop limiting its radial motion. In this manner, the radial dimensions of the recess of the ratchet wheel are limited to a necessary minimum, while at the same time an unnecessarily large excursion of the transporting ratchet and a correspondingly unnecessary heavy stress of the contact spring of the transporting ratchet are unnecessary.

For the desired operation of the device, it is found to be advantageous to arrange the pivot bearing of the one-arm lever at its end which is forward in the direction of rotation of the ratchet wheel. During the rotation of the ratchet wheel, the part of the one-arm lever which is adjacent to the pivot bearing and therefore acts with a relatively large lever arm then comes first into contact with the transporting ratchet. Also if the velocity of rotation of the ratchet wheel is still relatively small, a centrifugal force sufficient for lifting out the transporting ratchet is available. With increasing distance from the pivot bearing, the lever action becomes smaller, but the velocity of rotation of the ratchet wheel continues to increase instead and thereby provides for sufficient force action on the transporting ratchet.

BRIEF DESCRIPTION OF THE DRAWINGS

The invention will be explained in the following in greater detail with the aid of the embodiment shown in the figures, in which:

FIGS. 1 and 2 show part of the drive device of a low-voltage circuit breaker in two orthogonal views partly in cross-section, FIG. 1 showing the section I—I of FIG. 2; and FIG. 3 shows a detail in the vicinity of a ratchet wheel of the drive device according to FIGS. 1 and 2 partially in cross-section according to section lines III—III of FIG. 1.

DETAILED DESCRIPTION

Figure 1:
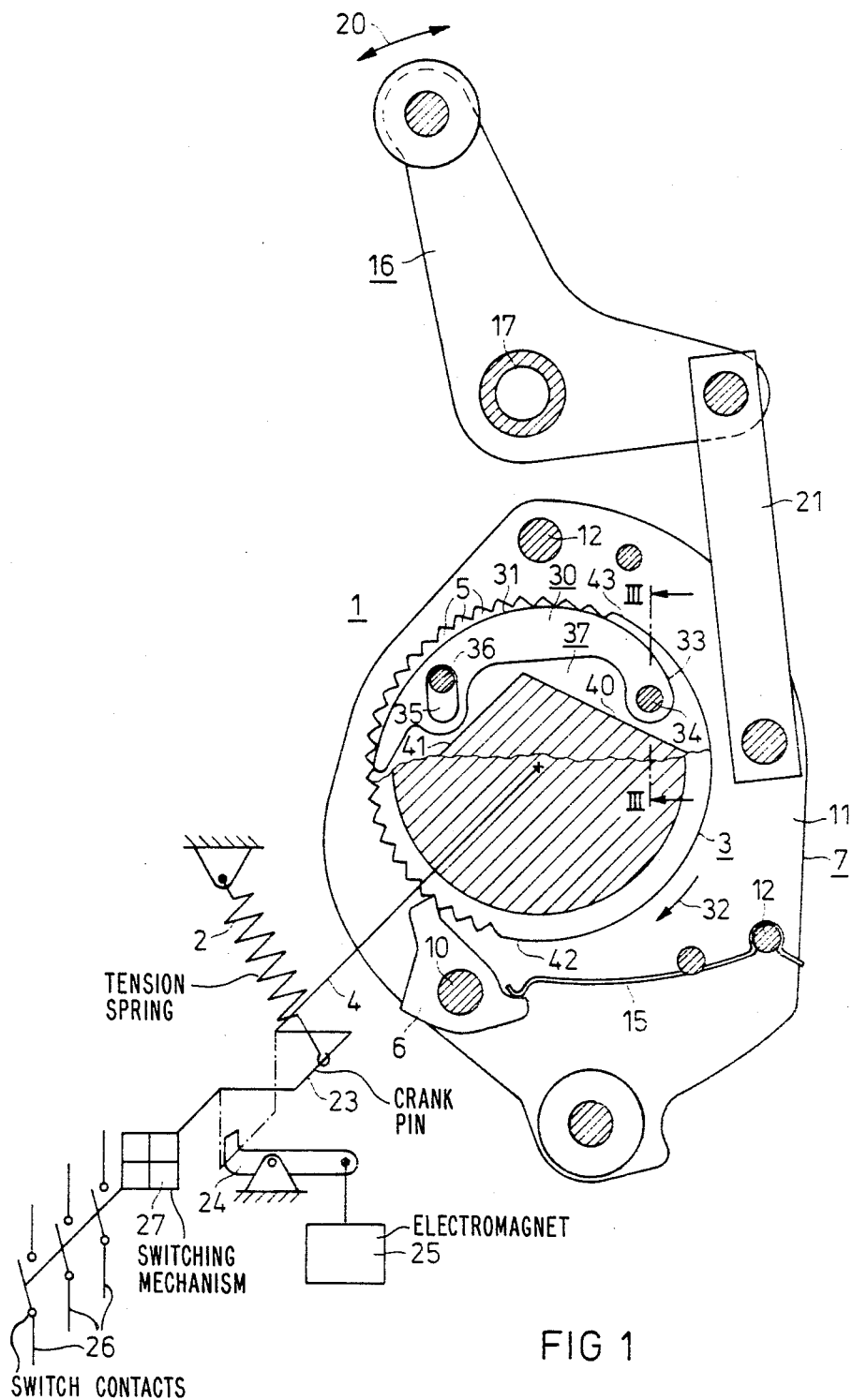

In the figures, the essential parts of the drive device for a low-voltage circuit breaker are shown. The drive device designated generally by 1 acts as an accumulator drive and has for this purpose a tension spring 2 as the energy accumulator. Instead of the single tension spring shown, two or more tension springs or a corresponding arrangement of compression springs or another energy accumulator can be provided which can be cocked by a mechanical motion. For tensioning the tension spring 2 serves a ratchet wheel 3 which is fastened on a suitable shaft 4 (FIG. 2) indicated only schematically and supported in suitable bearings. The ratchet wheel 3 is provided with teeth 5 which are arranged at the circumference of the ratchet wheel 3 with uniform pitch. About one-half of the circumference of the ratchet wheel 3 has no teeth. The purpose of this design will be explained later.

With the teeth 5 of the ratchet wheel 3 cooperates a transporting ratchet 6 which is arranged in a rotatably supported cage 7 tiltable about a pivot bolt 10. The cage 7 consists of two plates 11 which are kept by connecting elements 12 at a suitable distance and are connected rigidly. By circular cutouts 13 of the plates 11, the cage 7 is supported on the ratchet wheel 3 which has steps 14 on both sides of the teeth for this purpose. A bending spring 15 makes available a contact pressure by which the transporting ratchet 6 is kept in engagement with the teeth 5.

The cage 7 is connected flexibly to an angle lever 16 which is pivoted about a stationary bearing 17 and can be driven back and forth at its free end in accordance with the double arrow 20. For this purpose, a motor with a transmission and an eccentric can be provided in a manner known per se. The periodic tilting movement of the angle lever 16 is transmitted by a coupling rod 21 to the cage 7 and thereby converted into a periodic angular rotation. In connection with a pawl stop 22 (FIG. 2), which may be, in a manner known per se, a directional escapement with a ratchet wheel similar to the ratchet wheel 3 or a grip-roller free-wheeling arrangement, the ratchet wheel 3 is stepped by the periodic tilting motion of the angle lever 16. In the process, the tension spring 2 is cocked by means of the crank pin 23 schematically shown in FIGS. 1 and 2 until the dead center position with respect to the force engagement of the tension spring 2 at the crank pin 23 is reached and the crank pin gets to a stop at a ratchet pawl 24 (FIG. 1) shortly after passing dead center. By means known per se, for instance, an end switch, the drive motor which causes the periodic tilting motion of the angle lever 16 is then shut down.

If the circuit breaker is to be switched on, the ratchet pawl 24 is actuated by a suitable auxiliary drive, for instance, the electromagnet 25 schematically shown in FIG. 2, and thereby the crank pin 23 is released. The switch contacts 26 of the circuit breaker, also shown schematically, are then closed via a switching mechanism 27.

A detailed presentation of the force transmission from the shaft 4 to the switch contact 25 has been dispensed with because the corresponding parts are generally known in various designs. Reference is made in this connection to U.S. Pat. No. 3,301,984.

The release of the tension spring 2 upon switching-on is accompanied by an extremely fast rotation of the ratchet wheel 3. Premature wear of the cooperating parts is prevented by a centrifugal force lever 30 which is arranged in the ratchet wheel 3. The centrifugal force lever 30 has an outer working surface 31 in the shape of a circular arc as coupling means and is pivoted at its forward end 33 (in the direction of rotation of the ratchet wheel 3, arrow 32) on a pin 34 arranged at a distance from the axis of rotation of the ratchet wheel. It thereby acts as a one-arm lever. Near its rear end, as seen in the direction of rotation of the ratchet wheel, the centrifugal force lever 30 has an elongated hole 35 for a stop pin 36 which is attached to the ratchet wheel 3 and limits the tilting motion of the centrifugal force lever 30 toward the outside. As can be seen from viewing FIG. 1, the centrifugal force lever 30 has on its inside a contour which in rough approximation likewise corresponds to a circular arc, as far as the arrangement of the bearing pin 34, the stop pin 36 as well as the required strength permit. For accommodating the centrifugal force lever 30 at the ratchet wheel 3, the recess 37 of relatively small depth which is formed in the example shown by two straight cuts with the edges 40 and 41 is therefore sufficient. The radial recess 37 is at the center of the ratchet wheel 3, as is shown in FIG. 3.

As already mentioned, the teeth of the ratchet wheel 3 extend only over about one-half of the circumference of the ratchet wheel. In the position shown in FIG. 1, the ratchet wheel 3 is located near the dead-center position of the crank pin 23 since only three teeth 5 must be travelled up to the toothless region 42. The toothless region 42 can be provided if only one transporting ratchet 6 is required and the ratchet wheel is not at the same time required as a pawl stop for the engagement of a further ratchet. As already mentioned, a separate pawl stop 22 (FIG. 2) is provided.

During the release of the tension spring 2, the transporting ratchet 6 therefore slides initially on the toothless portion 42 of the ratchet wheel 3 substantially without wear. In the further course of the motion cycle, the ratchet wheel 3 does not come to a standstill, however, with the end portion 43 of the toothless region 42 at the transporting ratchet 6, but continues to rotate. The degree to which this happens depends on how large the excess of energy is; for instance, the further rotation of the ratchet wheel 3 turns out to be relatively small if the switch contacts 26 are switched on under heavy load, while a release of the tension spring 2 leads to considerably greater further rotation of the ratchet wheel 3 if the switch contacts 26 are already closed. Accordingly, the transporting ratchet 6 travels through a larger or smaller part of the tooth region of the ratchet wheel 3. Contact of the transporting ratchet 6 with the teeth 5, however, is prevented by the centrifugal force lever 30 which is urged outward due to the fast rotation of the ratchet wheel 3, so that now the transporting ratchet 6 slides over the working surface 31, protruding beyond the teeth 5, of the centrifugal force lever 30. As soon as the excess energy is consumed and the ratchet wheel 3 comes to a standstill, the centrifugal force disappears so that the transporting ratchet 6 is brought into engagement with the teeth of the ratchet wheel 3 by the bending spring 15 at the same instant. To this end, the bending spring 15 is designed so that it can overcome the motion resistance of the centrifugal force lever 30.

As is shown in FIG. 1, the working surface 31 of the centrifugal force lever 30 covers an angle of about 120° and therefore the area which is maximally traversed when the tension spring 2 is released. If a ratchet wheel with a larger portion of the circumference with teeth or a ratchet wheel with teeth on the entire circumference is used, undesirable wear of the transporting ratchet or further ratchets engaging the teeth can be prevented by one or several further centrifugal force levers which are designed logically in the same manner as the centrifugal force lever 30 and are attached to the ratchet wheel 3.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A drive device for a circuit breaker comprising ratchet wheel means for cocking an energy accumulator means by stepwise rotation of the ratchet wheel means by a transporting ratchet means and having means for automatically lifting the transporting ratchet means out of teeth of the ratchet wheel means while the ratchet wheel means rotates in the course of tension release of the energy accumulator means comprising coupling means for acting upon the transporting ratchet means by a centrifugal force whereby the transporting ratchet means is lifted out of the teeth of the ratchet wheel means, the operation of said coupling means being on the rotation of the ratchet wheel means during the tension release of the energy accumulator means, said coupling means comprising a pivotable member supported radially tiltably and asymmetrically and being spaced a distance away from an axis of rotation of the ratchet wheel means and being coupled to the ratchet wheel means, the pivotable member comprising a one-arm lever which has an outer working surface in the form of a circular arc for contacting the transporting ratchet means when said centrifugal force is developed, the one-arm lever being disposed in a radial recess in the ratchet wheel means, said one-arm lever cooperating with a stop pin for limiting the radial motion thereof.

2. The drive device recited in claim 1, wherein said one-arm lever comprises a circular arc-shaped member and further comprising a pivot bearing for the one-arm lever arranged at a forward end thereof as viewed in the direction of rotation of the ratchet wheel means.

* * * * *